(12) United States Patent
Miyamoto et al.

(10) Patent No.: US 11,279,028 B2
(45) Date of Patent: Mar. 22, 2022

(54) CONTROL APPARATUS, ROBOT SYSTEM, AND ROBOT

(71) Applicant: Seiko Epson Corporation, Tokyo (JP)

(72) Inventors: Yoshito Miyamoto, Matsumoto (JP); Tsuguya Kojima, Chino (JP); Yuki Sato, Sakata (JP)

(73) Assignee: Seiko Epson Corporation

( * ) Notice: Subject to any disclaimer, the term of this patent is extended or adjusted under 35 U.S.C. 154(b) by 350 days.

(21) Appl. No.: 16/585,022

(22) Filed: Sep. 27, 2019

(65) Prior Publication Data

US 2020/0101605 A1 Apr. 2, 2020

(30) Foreign Application Priority Data

Sep. 28, 2018 (JP) .............................. JP2018-184813

(51) Int. Cl.
*B25J 9/16* (2006.01)
*B25J 13/08* (2006.01)
*B25J 19/02* (2006.01)

(52) U.S. Cl.
CPC ........... *B25J 9/1635* (2013.01); *B25J 13/089* (2013.01); *B25J 19/022* (2013.01)

(58) Field of Classification Search
CPC ............... B25J 9/16; B25J 13/08; B25J 19/02
See application file for complete search history.

(56) References Cited

U.S. PATENT DOCUMENTS

| 9,522,412 B2 * | 12/2016 | Rina ................... B05C 11/1018 |
| 2007/0192910 A1 * | 8/2007 | Vu ........................... B25J 19/06 700/245 |
| 2011/0320038 A1 * | 12/2011 | Motoki ................ B25J 19/0008 700/245 |
| 2012/0185094 A1 * | 7/2012 | Rosenstein .......... G05D 1/0251 700/259 |
| 2015/0183113 A1 * | 7/2015 | Wakaizumi ........... B05B 12/126 427/427.2 |
| 2016/0041071 A1 * | 2/2016 | Bruehwiler ........ G01N 35/0099 73/61.59 |
| 2016/0067732 A1 * | 3/2016 | Nakamura .......... B05B 13/0405 427/427.2 |
| 2016/0306364 A1 * | 10/2016 | Ikushima ............... B05C 5/0225 |
| 2017/0140539 A1 * | 5/2017 | Wang ......................... G06T 7/73 |
| 2017/0157783 A1 * | 6/2017 | Ogawa .................... F16P 3/003 |
| 2019/0232015 A1 * | 8/2019 | Wruck ................ A61M 16/108 |

FOREIGN PATENT DOCUMENTS

| JP | H05-301076 A | 11/1993 |
| JP | H11-333348 A | 12/1999 |
| JP | 2003-019451 A | 1/2003 |
| JP | 2006-122740 A | 5/2006 |

* cited by examiner

*Primary Examiner* — Kira Nguyen
(74) *Attorney, Agent, or Firm* — Harness, Dickey & Pierce, P.L.C.

(57) ABSTRACT

A control apparatus that controls a robot including a dispenser and range sensors includes a control unit, and the control unit controls a robot arm, when the dispenser is moved in a first moving direction, to place the first range sensor anterior and calculates an amount of ejection using a difference between values detected by the first range sensor and the second range sensor forming a set and controls the robot arm, when the dispenser is moved in a second moving direction, to place the third range sensor anterior and calculates the amount of ejection using a difference between values detected by the third range sensor and the fourth range sensor.

10 Claims, 12 Drawing Sheets

CONTROL APPARATUS, ROBOT SYSTEM, AND ROBOT

The present application is based on, and claims priority from, JP Application Serial Number 2018-184813, filed Sep. 28, 2018, the disclosure of which is hereby incorporated by reference herein in its entirety.

BACKGROUND

1. Technical Field

The present disclosure relates to a control apparatus, robot system, and robot.

2. Related Art

In related art, a method of testing an application state of an adhesive when the adhesive ejected from a nozzle is linearly applied to a work is known (for example, JP-A-5-301076). In the method, a robot including a plurality of optical sensors placed posterior to the nozzle relative to an application direction of the adhesive, i.e., a moving direction of the nozzle is used. The application state of the adhesive is tested according to a combination of signals output from the plurality of optical sensors provided in the robot.

In related art, it is necessary to control the robot so that the positions of the plurality of optical sensors may constantly be posterior to the nozzle relative to the moving direction of the nozzle. Accordingly, for example, when the moving direction of the nozzle is changed, it may be necessary to largely change the posture of the robot around the nozzle for adjustment of the positions of the plurality of optical sensors. In this case, with the large posture change, excessive tensile stress is generated in a cable attached to the distal end of the robot and damage such as disconnection may be caused.

SUMMARY

According to an aspect of the present disclosure, a control apparatus that controls a robot including a robot arm, a dispenser provided at a distal end of the robot arm and ejecting an ejected material, and range sensors arranged around the dispenser and detecting distances to an object in a direction in which the ejected material is ejected is provided. The control apparatus includes a control unit that controls an operation of the robot arm and calculates an amount of ejection of the ejected material ejected from the dispenser using values detected by the range sensors, wherein the control unit controls the robot arm, when the dispenser is moved in a first moving direction, to place the first range sensor anterior in the first moving direction relative to the dispenser and calculates the amount of ejection using a difference between a value detected by the first range sensor and a value detected by the second range sensor placed posterior in the first moving direction relative to the dispenser and controls the robot arm, when the dispenser is moved in a second moving direction, to place the third range sensor anterior in the second moving direction relative to the dispenser and calculates the amount of ejection using a difference between a value detected by the third range sensor and a value detected by the fourth range sensor placed posterior in the second moving direction relative to the dispenser.

DESCRIPTION OF EXEMPLARY EMBODIMENTS

A. First Embodiment

Figure 1:
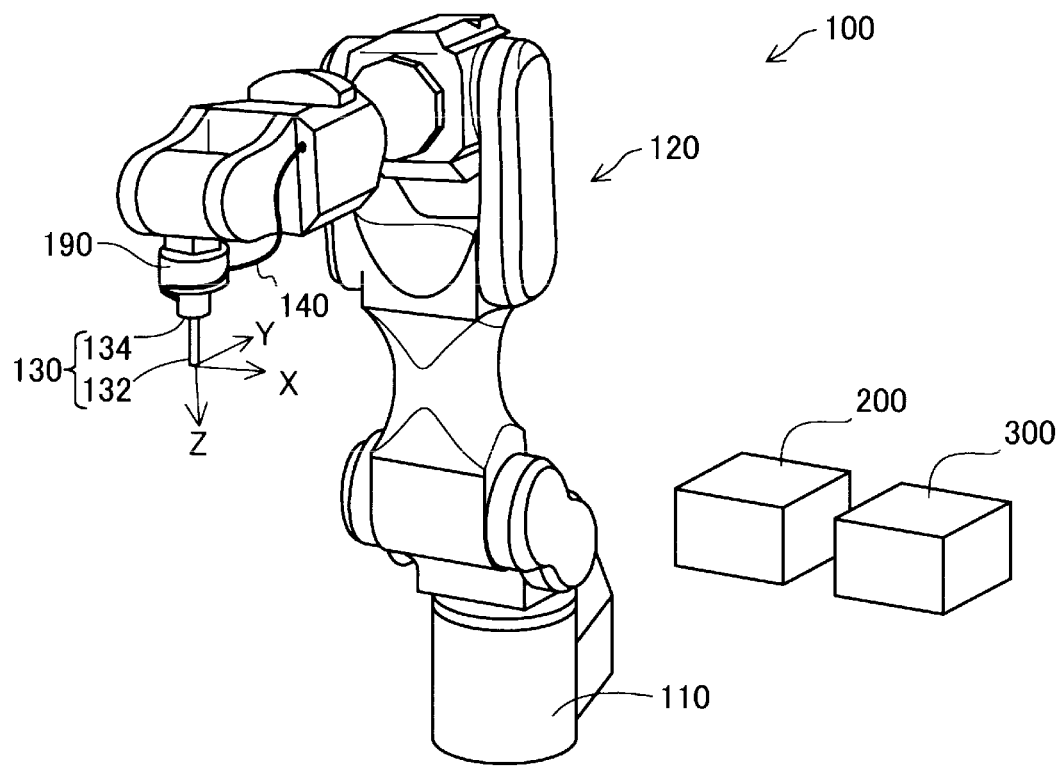
FIG. 1 is a perspective view showing an example of a robot system.
Figure 2:
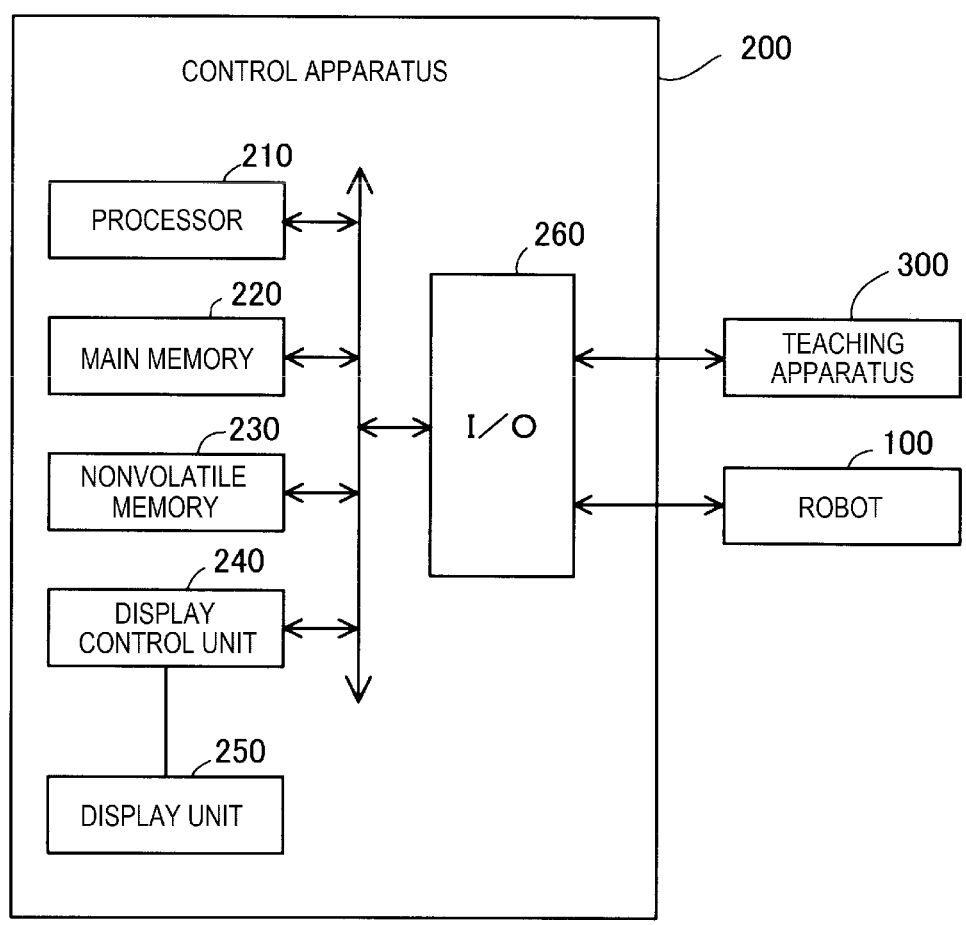
FIG. 2 is a block diagram showing functions of a robot and a control apparatus.

FIG. 1 is the perspective view showing the example of the robot system. FIG. 2 is the block diagram showing the functions of the robot 100 and the control apparatus 200. As below, a configuration of the robot system according to the embodiment will be explained using FIGS. 1 and 2. The robot system includes the robot 100, the control apparatus 200, and a teaching apparatus 300. The control apparatus 200 is communicably connected to the robot 100 and the teaching apparatus 300 via cables or wireless connection.

The robot 100 executes work according to teaching data created in advance. Further, the robot 100 can adjust an operation according to a detection value acquired from a sensor provided in the robot system. As shown in FIG. 1, the robot 100 includes a base 110 and a robot arm 120. Hereinafter, the robot arm 120 is simply referred to as "arm 120".

The arm 120 includes a plurality of joints. A force sensor 190 is provided at the distal end of the arm 120, and an end effector 130 is attached to a distal end side of the force sensor 190. In the example of FIG. 1, for convenience of illustration, the end effector 130 is drawn in a simple shape. The number of axes of the arm 120 is six. Thereby, the arm 120 may move the end effector 130 to an arbitrary position according to an instruction from the control apparatus 200.

In the embodiment, the end effector 130 includes a needle 132 as a dispenser that ejects an ejected material, and a plurality of range sensors 134 that detect distances from an ejection surface S to which the ejected material is ejected from the needle 132. The end effector 130 is electrically coupled to the arm 120 via a wire 140. The wire 140 is attached to be visually recognizable from outside of the robot 100.

The force sensor 190 is a six-axis force sensor that measures an external force applied to the end effector 130. Note that the force sensor 190 is not limited to the six-axis force sensor. For example, a force sensor having five axes or less may be employed. Further, in the embodiment, the force sensor 190 is provided at the distal end of the arm 120, however, not limited to that. For example, the force sensor 190 may be provided in one of the joints of the arm 120.

As shown in FIG. 2, the control apparatus 200 has a processor 210, a main memory 220, a nonvolatile memory 230, a display control unit 240, a display unit 250, and an I/O interface 260. There respective parts are coupled via a bus. The processor 210 is e.g. a microprocessor or processor circuit and functions as a control unit for controlling the operation of the robot 100. Hereinafter, the processor 210 is also referred to as "control unit 210". The control apparatus 200 is coupled to the robot 100 and the teaching apparatus 300 via the I/O interface 260. Note that the control apparatus 200 may be held inside of the robot 100. In the embodiment, the control apparatus 200 may control the robot 100 using a tool coordinate system around the distal end of the end effector 130. A tool center point as the origin of the tool coordinate system is a distal end center of the needle 132 as a part of the end effector 130. Further, a Z-axis of the tool coordinate system is an axis extending in a direction along the opening direction of the needle 132. The +Z-axis direction as a plus direction in the Z-axis direction is an ejection direction of the ejected material by the needle 132. An X-axis and a Y-axis are orthogonal to each other and extend in directions orthogonal to the Z-axis.

The control apparatus 200 drives an actuator according to teaching data stored in the main memory 220 and values output from the range sensors 134, and thereby, moves the arm 120. For realization of various functions of the control apparatus 200, programs stored in the nonvolatile memory 230 in advance are used.

Note that the configuration of the control apparatus 200 can be changed as appropriate and is not limited to the configuration shown in FIG. 2. For example, the processor 210 and the main memory 220 may be provided in another apparatus that can communicate with the control apparatus 200. In this case, the control apparatus 200 and the other apparatus function as a control apparatus of the robot 100. Further, the control apparatus 200 may include a plurality of the processors 210.

The teaching apparatus 300 is used for creation of control programs containing the teaching data for work by the robot 100. The teaching apparatus 300 is also called "teaching pendant". Note that, in place of the teaching pendant, a personal computer having an application program for teaching processing may be used. The teaching apparatus 300 transmits the created teaching data to the control apparatus 200. The transmitted teaching data is stored in the main memory 220 of the control apparatus 200.

Figure 3:
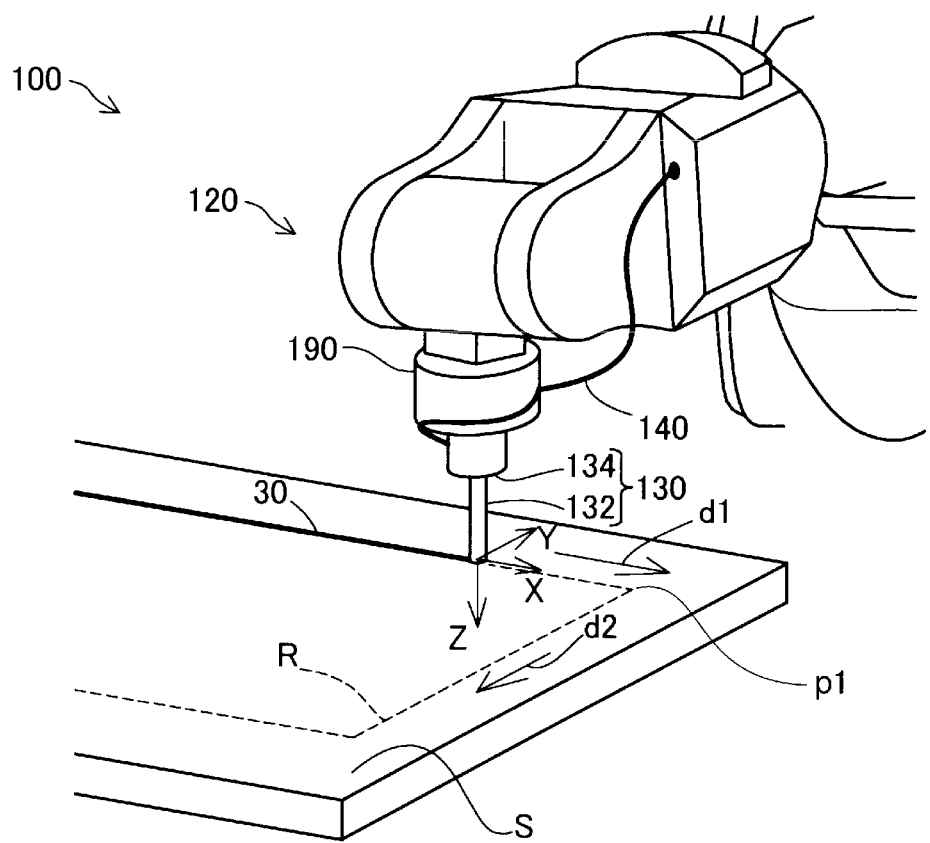
FIG. 3 is a schematic diagram showing a state of the robot when ejecting an ejected material.

FIG. 3 is the schematic diagram showing the state of the robot 100 when ejecting the ejected material 30. As below, the outline of details of control of the robot 100 executed by the control apparatus 200 will be explained using FIG. 3.

The robot 100 ejects an adhesive as the ejected material 30 from the needle 132, and thereby, applies the adhesive to the ejection surface S. The ejection surface S refers to a surface to be processed of various manufactured items containing e.g. a smartphone case, a liquid crystal panel, a camera module completed by an injection machine, etc. Note that the ejected material 30 is not limited to the adhesive. For example, the ejected material 30 may be a liquid material, gel material, or gel material having viscosity and can be changed depending on the usage of the robot 100 as appropriate. More specifically, for example, the ejected material 30 may be a resin used as paint, a sealing member, a buffer material, or the like.

When the ejected material 30 is applied to the ejection surface S, the arm 120 drives the needle 132 to move along a predetermined application track R according to the control from the control apparatus 200. Further, when the ejected material 30 is applied to the ejection surface S, the control apparatus 200 executes various kinds of control. For example, the control apparatus 200 executes height correction control and angle correction control. The height correction control is to control the distance between the needle 132 and the ejection surface S to be a preset distance. The angle correction control is to control the angle between the needle 132 and the ejection surface S to be a preset angle. The values output from the range sensors 134 are used for the height correction control and the angle correction control. Further, the control apparatus 200 measures an amount of the ejected material 30 ejected from the needle 132 using the detection values of the range sensors 134.

Figure 4:
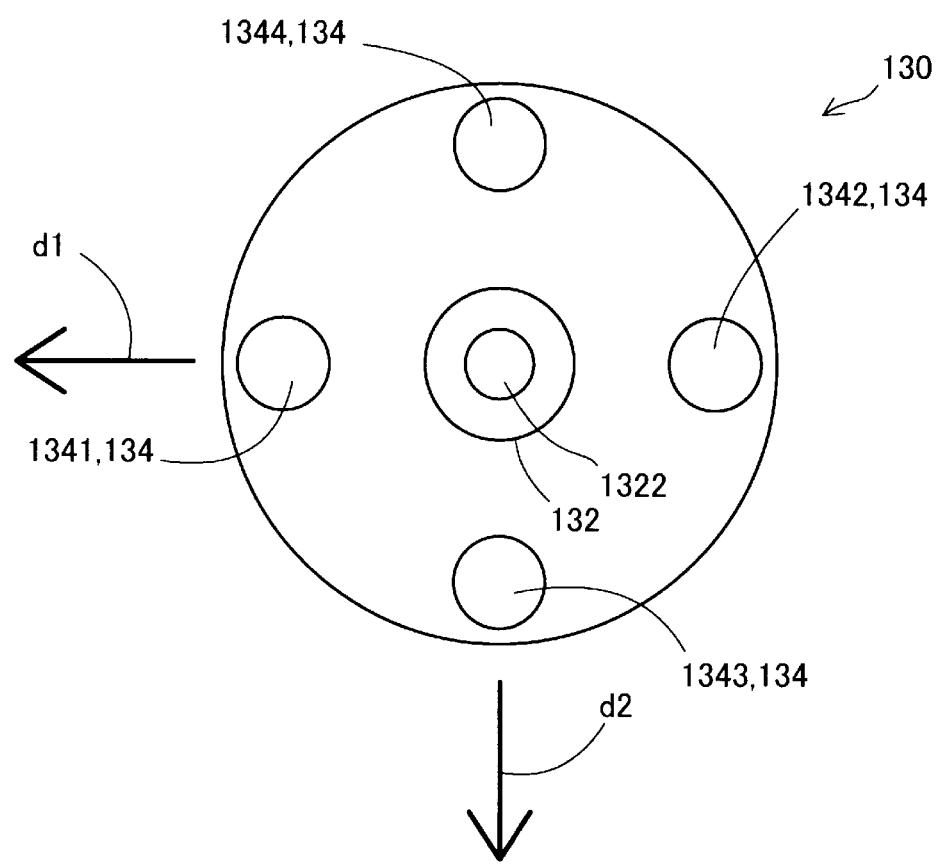
FIG. 4 is a schematic diagram showing a position relationship between a needle and range sensors.

FIG. 4 is the schematic diagram showing the position relationship between the needle 132 and the range sensors 134. FIG. 4 schematically shows a front view of the end effector 130 as seen from the distal end side of the needle 132. In FIG. 4, a first moving direction d1 and a second moving direction d2 in the posture of the robot 100 shown in FIG. 3 are shown. As below, the positions of the needle 132 and the range sensors 134 will be explained using the position relationship as seen from the distal end side of the needle 132.

In the embodiment, the end effector 130 includes four range sensors 1341 to 1344 arranged around the needle 132 as the range sensors 134. Hereinafter, for convenience of explanation, the respective four range sensors 1341 to 1344 are also referred to as "first range sensor 1341", "second range sensor 1342", "third range sensor 1343", and "fourth range sensor 1344".

Specifically, the first range sensor 1341 and the second range sensor 1342 form a set and are arranged with the needle 132 in between. Similarly, the third range sensor 1343 and the fourth range sensor 1344 form a set and are arranged with the needle 132 in between. In the embodiment, the distances of the four range sensors 1341 to 1344 from the needle 132 are the same. That is, the four range sensors 1341 to 1344 are arranged at a circumference around the needle 132. Note that the description that the distances from the needle 132 are the same includes not only the case where the distances are completely the same but also the case where the distances are substantially the same. For example, regarding the two range sensors, the distances from the needle 132 are substantially the same when the difference in distance from the needle 132 is equal to or less than 5% of the distance between the range sensor farther from the needle 132 of the two range sensors and the needle 132. In the embodiment, the direction connecting the first range sensor 1341 and the second range sensor 1342 and the direction connecting the third range sensor 1343 and the fourth range sensor 1344 are orthogonal to each other. In the embodiment, the term "orthogonal" includes not only the completely orthogonal case but also e.g. the case where the angle at the obtuse angle side is 85 degrees or more. Note that, in the embodiment, the distances from the needle 132 to the respective range sensors 1341 to 1344 are the minimum distances from the center of an opening 1322 of the needle 132 to the respective range sensors 1341 to 1344 in a plan view of the end effector 130 from the distal end side toward the proximal end side of the needle 132.

An ultrasonic sensor is used for the range sensor 134. When the ultrasonic sensor is used for the range sensor 134, for example, compared to the case of using an optical sensor, signal processing is easier. For example, compared to the case of using the optical sensor, a time from transmission to reception of ultrasonic wave as a signal is longer in the ultrasonic sensor. Accordingly, compared to the case of using the optical sensor, necessary response speed and temporal resolution are lower in the case of using the ultrasonic sensor. In the embodiment, the ultrasonic sensor is an ultrasonic array in which a plurality of ultrasonic generation elements are arranged. The ultrasonic array as the range sensor 134 functions as a transmitter that radiates ultrasonic wave generated according to flexural deformation of the ultrasonic generation elements toward a measuring object. Further, the ultrasonic array functions as a detector that may acquire ultrasonic wave reflected by the measuring object. The ultrasonic array can perform phase difference shift drive. The phase difference shift drive refers to a driving method of adjusting phase differences between ultrasonic waves generated from the respective ultrasonic generation elements by shifting driving times of the respective ultrasonic wave generation elements. Thereby, the ultrasonic array can arbitrarily change the transmission direction of the ultrasonic wave using interferences between the ultrasonic waves generated according to the phase differences. Accordingly, when the ultrasonic array that can perform phase difference shift drive is used as the range sensor 134, downsizing of the range sensor 134 is easier because it is not necessary to separately provide a mechanism for adjusting the transmission direction. In this case, compared to the case where another configuration is used as the range sensor 134, the degree of freedom in design is higher. In the embodiment, a piezoelectric element is used for the ultrasonic generation element. As the piezoelectric element, e.g. lead zirconate titanate (PZT), lead titanate (PbTiO$_3$), lead zirconate (PbZrO$_3$), or lead lanthanum titanate ((Pb,La)TiO$_3$) deposited in a film form may be used. In the embodiment, PZT deposited in a film form is used for the piezoelectric element.

Figure 5:
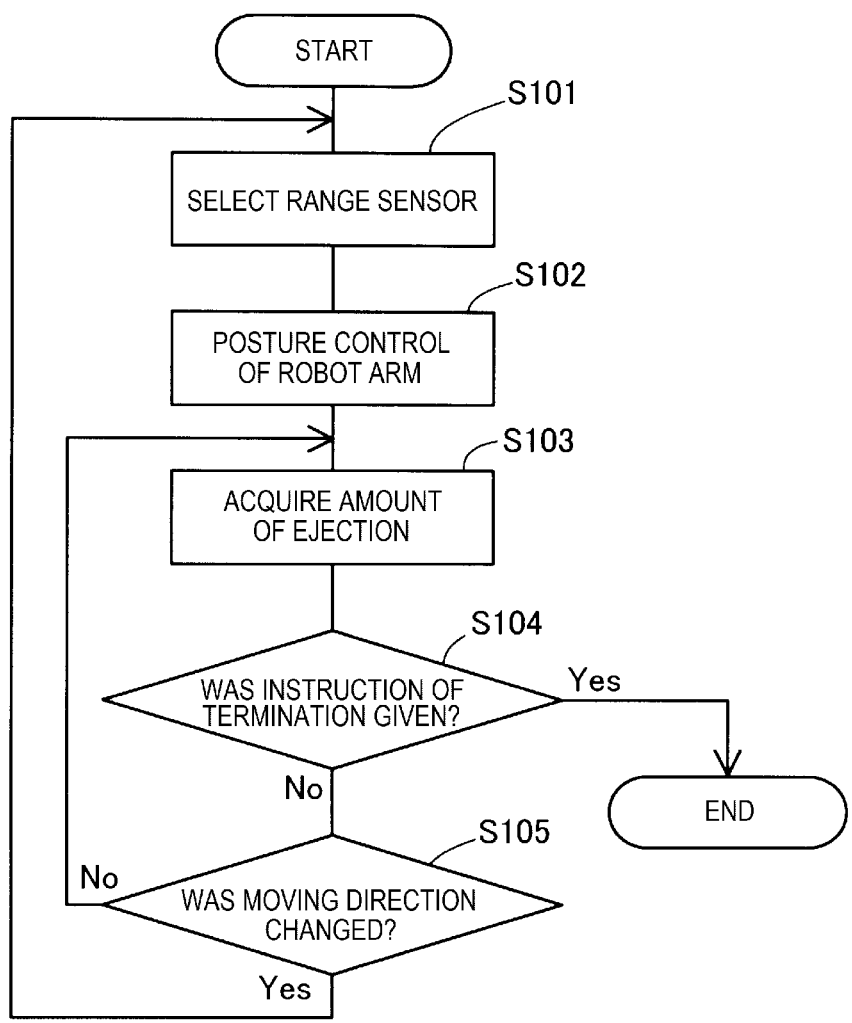
FIG. 5 is a flowchart for explanation of a procedure of acquisition processing of an amount of ejection.

FIG. 5 is the flowchart for explanation of the procedure of the acquisition processing of the amount of ejection in the embodiment. The acquisition processing of the amount of ejection shown in FIG. 5 is executed by the control unit 210 of the control apparatus 200. After an instruction to eject the ejected material 30 to the ejection surface S according to the teaching data is given to the robot 100, the control apparatus 200 starts the acquisition processing of the amount of ejection. When the acquisition processing of the amount of ejection is started, processing at step S101 of selecting the range sensor 134 to be used for the acquisition of the distance from the ejection surface S to which the ejected material 30 was not ejected among the plurality of range sensors 1341 to 1344 is started.

In the processing at step S101, the single range sensor 134 with less entanglement of the wire 140 when directed forward in the moving direction is selected among the plurality of range sensors 1341 to 1344. For example, when the posture of the arm 120 is changed at a plurality of times, control is performed so that the accumulated amount of posture changes compared to a reference posture of the arm 120 may be smaller. In this regard, for example, the selected range sensor 134 may be selected from the two range sensors 134 having the smallest and second smallest amount of posture changes of the arm 120. In this case, the number of the selectable range sensors 134 may be reduced and calculation for the selection of the range sensor 134 can be simplified. After the processing at step S101 is completed, the control unit 210 executes processing at step S102.

In the processing at step S102, the control unit 210 controls the posture of the arm 120 so that the range sensor 134 selected at step S101 may be located anterior in the moving direction of the end effector 130. After the processing at step S102 is completed, the control unit 210 executes processing at step S103.

In the processing at step S103, the control unit 210 acquires the amount of ejection. More specifically, in the processing at step S103, the control unit 210 acquires a distance De1 from the ejection surface S anterior in the moving direction of the end effector 130 using the range sensor 134 selected at step S101, e.g. the first range sensor 1341. Further, the control unit 210 acquires a distance De2 from the ejection surface S posterior in the moving direction of the end effector 130 using the other range sensor 134 forming the set with the range sensor 134 selected at step S101, e.g. the second range sensor 1342. The amount of ejection is calculated using a difference between the anterior distance De1 and the posterior distance De2. Note that, for the calculation of the amount of ejection, the detection values detected from the respective range sensors 134 may be corrected using angles formed by the transmission directions of the ultrasonic waves emitted from the range sensors 134 and the ejection surface S. Specifically, for example, the control unit 210 may correct the detection values to values indicating the distances from the ejection surface S in the vertical direction. The amount of ejection acquired by the processing at step S103 is output to and stored in the main memory 220.

Figure 6:
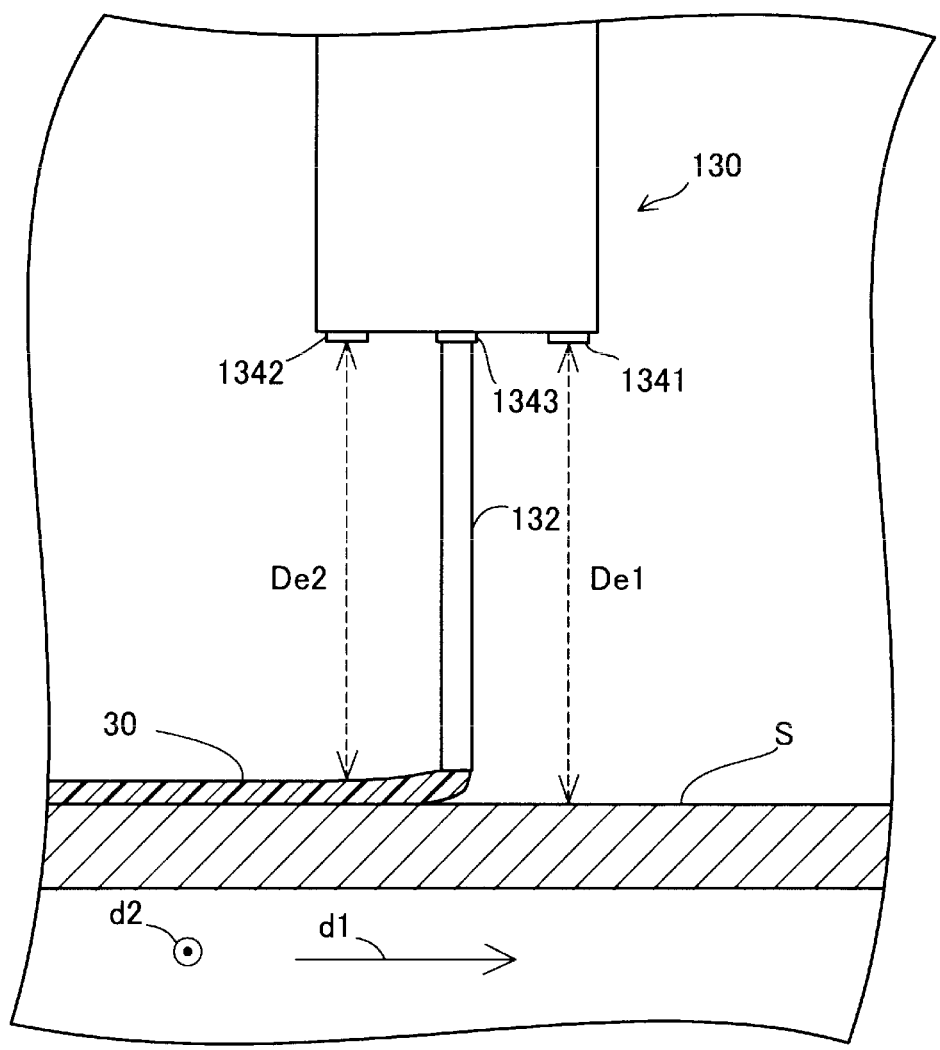
FIG. 6 is a schematic diagram showing a relationship between the range sensors and an ejection surface when the amount of ejection is acquired.

FIG. 6 is the schematic diagram showing the relationship between the range sensors 134 and the ejection surface S when the amount of ejection is acquired. The control unit 210 acquires the amount of ejection using the difference between the distance De1 from the ejection surface S anterior in the moving direction, e.g. the first moving direction d1 and the distance De2 from the ejection surface S posterior in the moving direction. As shown in FIG. 6, the distance De1 from the ejection surface S anterior in the moving direction d1 is a distance from the ejection surface S before the ejected material 30 is applied. The distance De2 from the ejection surface S posterior in the moving direction d1 is a distance from the ejection surface S after the ejected material 30 is applied.

In the processing at step S104 shown in FIG. 5, the control unit 210 determines whether or not termination of the processing was instructed. The termination of the processing is instructed when the ejection of the ejected material 30 by the robot 100 according to the teaching data ends. Alternatively, for example, the termination is instructed when interruption of the processing is executed by the control apparatus 200 according to detection of an error or entry of an instruction to stop from a user. When the result of the processing at step S104 is Yes, the control unit 210 ends the acquisition processing of the amount of ejection. On the other hand, when the result of the processing at step S104 is No, the control unit 210 executes processing at step S105.

In the processing at step S105, the control unit 210 determines whether or not the moving direction of the needle 132 was changed. The determination as to whether or not the moving direction of the needle 132 was changed is made by checking the application track R in the teaching data against the current position of the needle 132. In the processing at step S105, when the determination that the change of the moving direction is unnecessary is made, when the result of the processing at step S105 is No in the embodiment, the control unit 210 returns to step S103 and executes the processing at step S103 and the subsequent steps again. In the processing at step S105, when the determination that the change of the moving direction is necessary is made, when the result of the processing at step S105 is Yes in the embodiment, the control unit 210 returns to step S101 and executes the processing at step S101 and the subsequent steps again. The amount of ejection acquired in the series of processing shown in FIG. 5 is used for sensing of an ejection failure by the control unit 210, for example.

As below, a specific example of the acquisition processing of the amount of ejection shown in FIG. 5 will be explained using FIGS. 3 and 4. When the needle 132 is moved in the first moving direction d1, the control unit 210 controls the arm 120 to detect the distance to the ejection surface S anterior in the first moving direction d1 using the first range sensor 1341 forming one set of the two sets of range sensors 134 at step S102. Further, the control unit 210 controls the arm 120 to detect the distance to the ejection surface S posterior in first moving direction d1 using the second range sensor 1342 forming the set with the first range sensor 1341. In this case, the control unit 210 calculates the amount of ejection of the ejected material 30 using a difference between a value detected by the first range sensor 1341 and a value detected by the second range sensor 1342 at step S103.

When the needle 132 reaches a curved portion p1 in the application track R shown in FIG. 3, the control unit 210 selects the range sensor 134 used for moving the needle 132 in the second moving direction d2 by the processing at step S101 shown in FIG. 5. In the case shown in FIG. 3, the second moving direction d2 is a direction orthogonal to the first moving direction d1. Accordingly, when the moving direction is changed from the first moving direction d1 to the second moving direction d2, the control unit 210 controls the third range sensor 1343 forming the other set of the two sets of range sensors 134 to detect the distance to the ejection surface S anterior in the second moving direction d2. In this case, a direction connecting the first range sensor 1341 and the second range sensor 1342 and a direction connecting the third range sensor 1343 and the fourth range sensor 1344 are orthogonal, and thus, the posture change of the arm 120 can be minimized.

When the needle 132 is moved in the second moving direction d2, the control unit 210 controls the arm 120 to detect the distance to the ejection surface S anterior in the second moving direction d2 using the third range sensor 1343 forming the other set of the two sets of range sensors 134 at step S102. Further, the control unit controls the arm 120 to detect the distance to the ejection surface S posterior in second moving direction d2 using the fourth range sensor 1344 forming the set with the third range sensor 1343. In this case, the control unit 210 calculates the amount of ejection of the ejected material 30 using a difference between a value detected by the third range sensor 1343 and a value detected by the fourth range sensor 1344 at step S103.

In the example shown in FIG. 3, the first moving direction d1 and the second moving direction d2 are orthogonal to each other, however, the relationship between the first moving direction d1 and the second moving direction d2 is not limited to that. It is only necessary that the second moving direction d2 is different from the first moving direction d1. Further, when the change of the moving direction from the first moving direction d1 to the second moving direction d2 is slight or forms an acute angle, it is not necessary for the control unit 210 to change one set of range sensors 134 used for the acquisition of the amount of ejection when the moving direction is changed.

Figure 7:
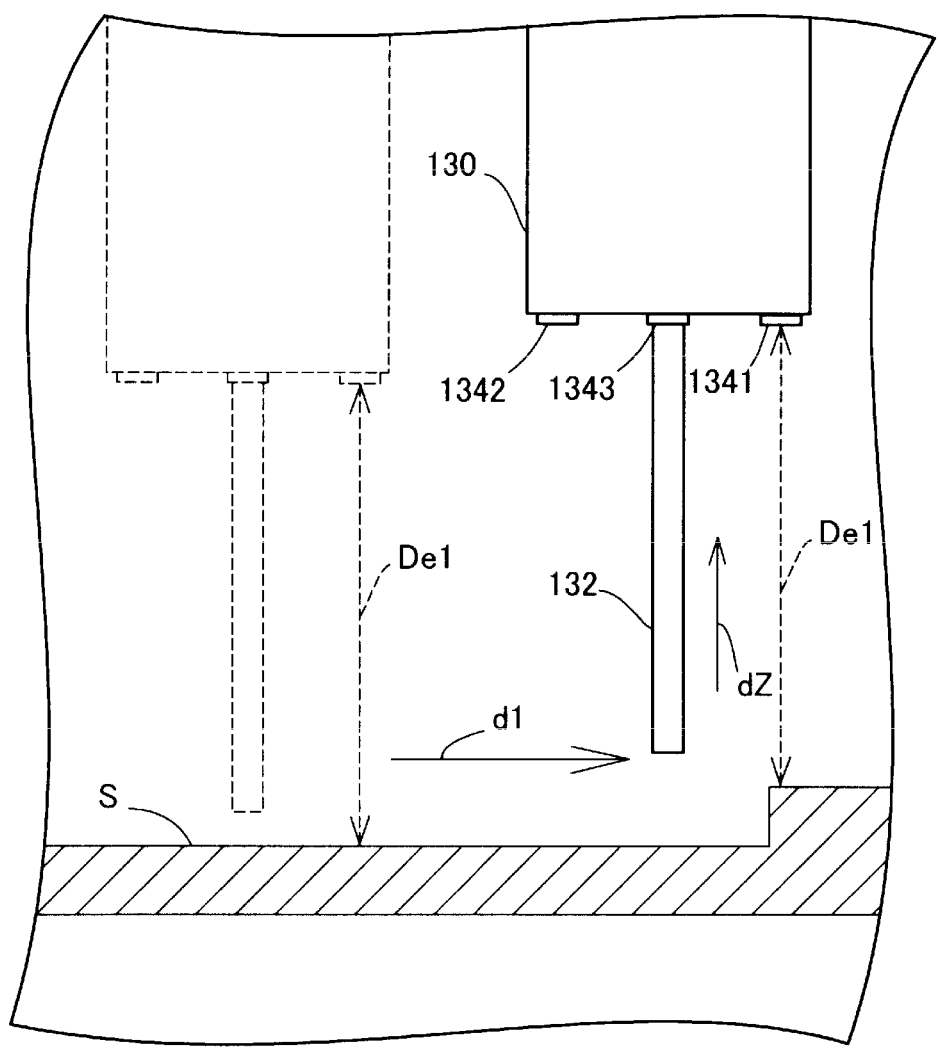
FIG. 7 is a schematic diagram showing a state of an end effector when height correction is executed.
Figure 8:
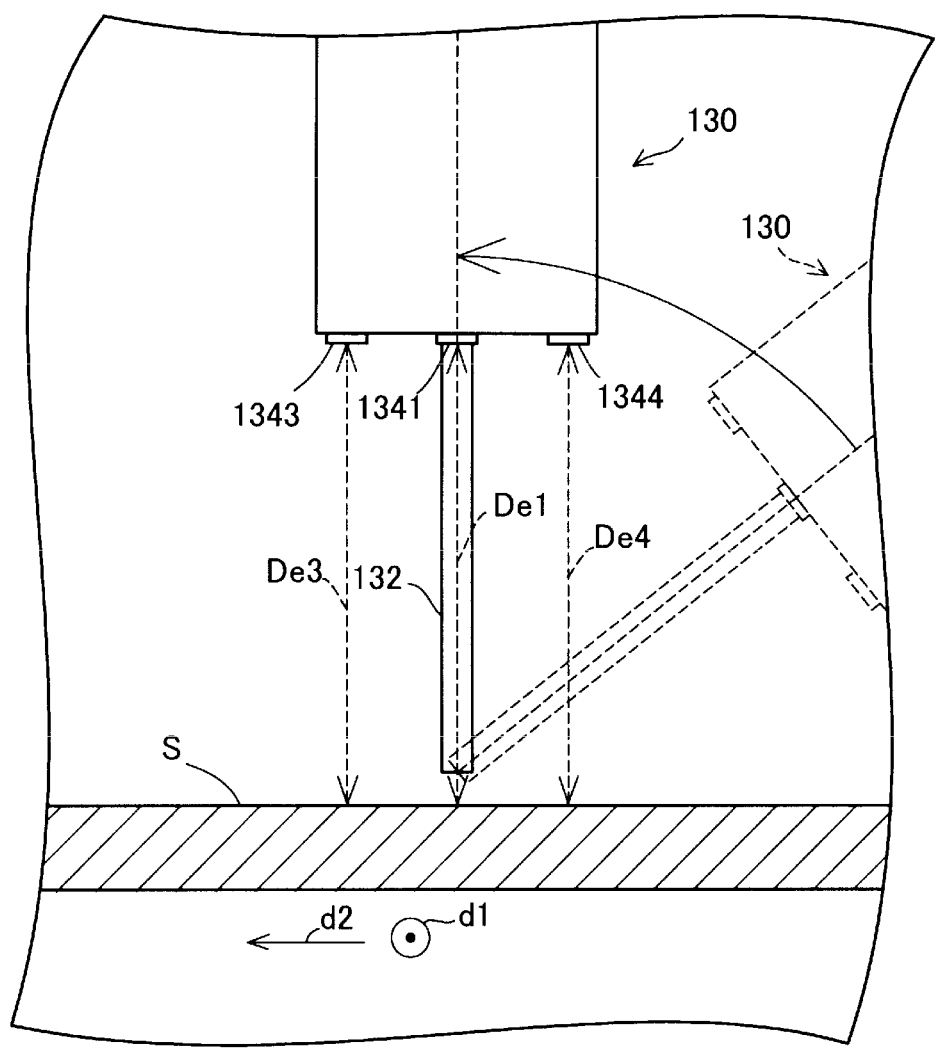
FIG. 8 is a schematic diagram showing a state of the end effector when angle correction is executed.

FIG. 7 is the schematic diagram showing the state of the end effector 130 when the height correction is executed. FIG. 8 is the schematic diagram showing the state of the end effector 130 when the angle correction is executed. In the embodiment, the control apparatus 200 executes angle correction processing of controlling the posture of the arm 120 so that the angle formed by the needle 132 and the ejection surface S may be a predetermined angle. The angle correction processing is executed in parallel to the ejection of the ejected material 30. Accordingly, the angle formed by the needle 132 and the ejection surface S is corrected in real time. In the embodiment, the posture of the arm 120 is controlled so that the needle 132 and the ejection surface S may be perpendicular. In the embodiment, the term "perpendicular" includes the case where the angle formed by the needle 132 and the ejection surface S is from 80 degrees to 100 degrees in addition to the case of 90 degrees. The angle formed by the needle 132 and the ejection surface S is an angle formed by a direction in which the ejected material is ejected in the needle 132 and the ejection surface S. Alternatively, when the ejection surface S is not a planar surface, a differential surface of the ejection surface S in a position overlapping with the ejection direction may be used as a reference.

In the embodiment, the control unit 210 executes height correction processing of controlling the posture of the arm 120 so that the distance between the needle 132 and the ejection surface S may be a predetermined distance. The height correction processing is executed in parallel to the ejection of the ejected material 30 and the angle correction processing. Accordingly, the distance between the needle 132 and the ejection surface S is corrected in real time. In the height correction processing, a value of one range sensor 134 selected according to the moving direction of the needle 132 is used. For example, the control unit 210 controls the detection value of the range sensor 134 located anterior in the moving direction of the needle 132 to be a reference value. In this case, the angle between the needle 132 and the ejection surface S is kept at the predetermined angle by the angle correction processing and the relationship between the range sensor 134 and the moving direction used for the height correction is fixed. Accordingly, the control unit 210 may control the distance according to the detection value of one range sensor 134. Note that the number of range sensors 134 used in the height correction processing may be two or more. For example, three or more range sensors 134 that measure distances from an area without application of the ejected material 30 of the ejection surface S may be used for the height correction processing. In this case, the control unit 210 may control the posture of the arm 120 so that the values detected from the three or more range sensors 134 may be predetermined values.

For example, as shown in FIG. 7, in the height correction executed when the needle 132 is moved in the first moving direction d1, the posture of the arm 120 is controlled to change the distance between the needle 132 and the ejection surface S according to the detection value detected by the first range sensor 1341. For example, when the value of the first range sensor 1341 is −1.000, the distance between the needle 132 and the ejection surface S is corrected so that the value of the first range sensor 1341 may be 0.000. In this case, the control unit 210 changes the posture of the arm 120 so that the needle 132 may move in a direction dZ along the Z-axis in the tool coordinate system. Note that, when the detection value 0.000 shows that the detection value acquired by the range sensor 134 is the same as the reference value, that is, without deviation from the reference value.

Alternatively, when the detection value is a value at the plus side, the value shows that the distance to the ejection surface S is a larger distance than the distance at the reference value. When the detection value is a value at the minus side, the value shows that the distance to the ejection surface S is a smaller distance than the distance at the reference value. In the embodiment, the detection value is a value converted into a distance and specifically converted into a value in units of centimeters. In the embodiment, the control unit 210 performs the height correction using the range sensor 134 located anterior in the moving direction. Accordingly, when there is a level difference in the application track R according to the teaching data, the height from the needle 132 to the ejection surface S may be corrected before the needle 132 reaches the level difference.

In the embodiment, the control unit 210 controls the posture of the arm 120 so that the values detected from the three or more range sensors 134 measuring the distances from the area without application of the ejected material 30 of the ejection surface S of the plurality of range sensors 134 may be the same value. In FIG. 8, the state when the needle 132 is moved in the first moving direction d1 is shown as an example. In this case, the control unit 210 controls the arm 120 so that respective distances De1, De3, De4 acquired by the first range sensor 1341, the third range sensor 1343, and the fourth range sensor 1344 may be the same distance. In the embodiment, relationships between the detection values of the respective range sensors 134 and amounts of driving of the arm 120 used when the posture of the arm 120 is controlled are stored in the nonvolatile memory 230 in advance. In FIG. 8, the state of the arm 120 when the detection values detected by the first range sensor 1341, the third range sensor 1343, and the fourth range sensor 1344 are 0.000, −1.000, and 1.000, respectively, are shown by broken lines. In this case, the posture of the arm 120 is controlled so that the detection values of the third range sensor 1343 and the fourth range sensor 1344 may be 0.000.

Figure 9:
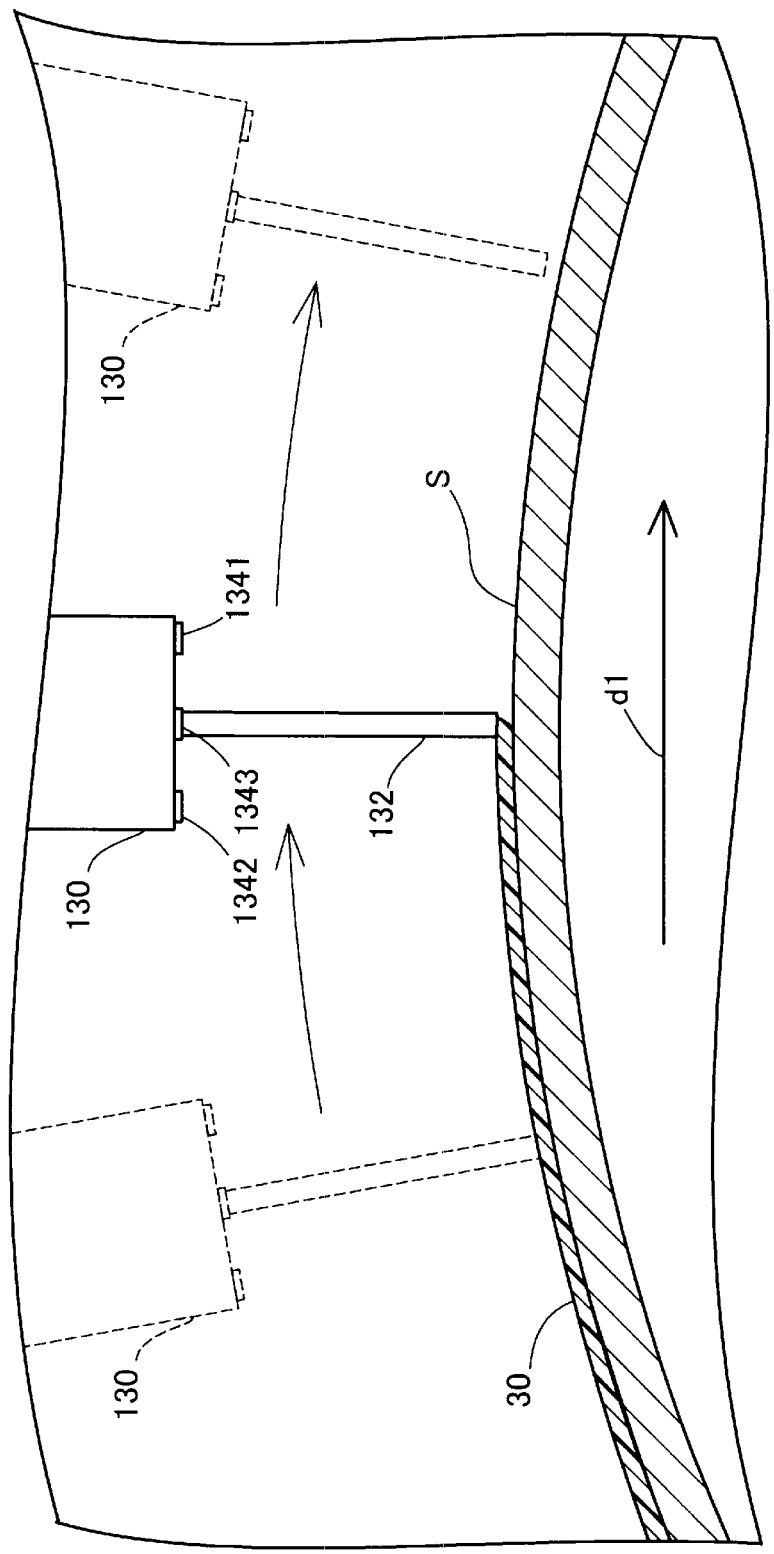
FIG. 9 is a schematic diagram showing a state of the end effector when the ejection surface is a curved surface.

FIG. 9 is the schematic diagram showing the state of the end effector 130 when the ejection surface S is a curved surface. In the embodiment, the angle and the distance between the needle 132 and the ejection surface S are corrected in real time by the angle correction processing and the height correction processing. Accordingly, as shown in FIG. 8, even when the ejection surface S is the curved surface, the control unit 210 may control the needle 132 to move along the ejection surface S.

According to the above described first embodiment, when acquiring the amount of ejection, the control unit 210 can differently use the two sets of range sensors 134 depending on the direction in which the needle 132 moves. Accordingly, compared to the case where only one set of range sensors 134 are used, when the moving direction of the needle 132 is changed, the degree of the posture change of the arm 120 around the needle 132 may be reduced. Thereby, the tensile stress applied to the wire 140 with the posture change of the arm 120 may be reduced. In this case, damage on the wire 140 due to application of excessive tensile stress to the wire 140 may be suppressed. Further, the control unit 210 takes the entanglement of the wire 140 into consideration when selecting the range sensor 134. Accordingly, tensile stress that may be generated due to the entanglement of the wire 140 with the arm 120 may be further reduced. Thereby, the damage on the wire 140 may be further suppressed.

According to the above described robot system, the height correction and the angle correction of the needle 132 can be made, and thus, quality of the application of the ejected material 30 to the ejection surface S may be stabilized. Further, the control apparatus 200 may correct contents of the teaching data created by the teaching apparatus 300 according to the shape of the real ejection surface S. For example, the control apparatus 200 may control the robot 100 to perform appropriate application even when only a planar application track R along the ejection surface S is entered.

B. Second Embodiment

Figure 10:
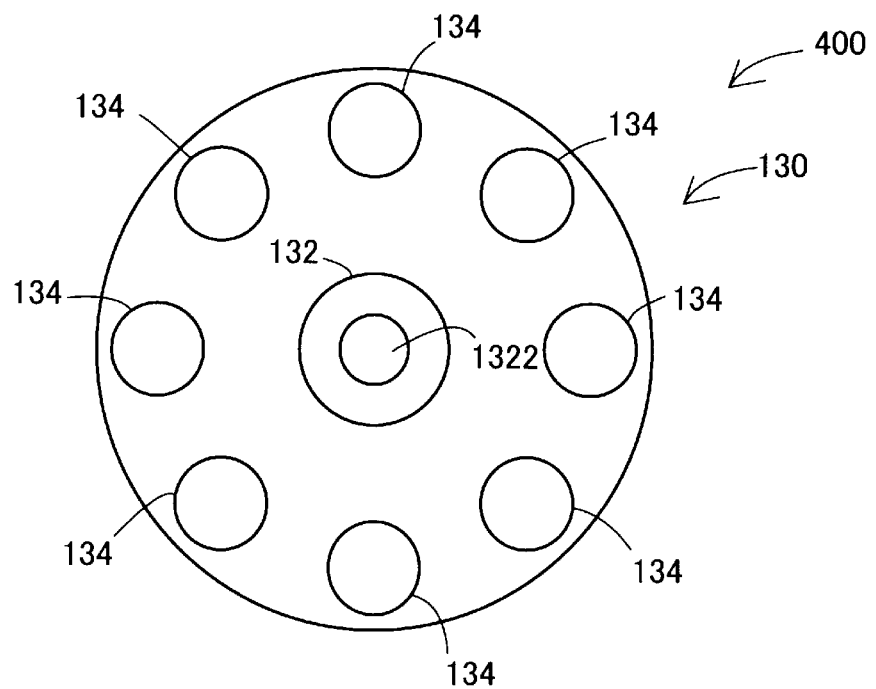
FIG. 10 is a schematic diagram showing a position relationship between a needle and range sensors in a second embodiment.

FIG. 10 is the schematic diagram showing the position relationship between the needle 132 and the range sensors 134 in the second embodiment. A robot 400 in the second embodiment is different from the robot 100 in the first embodiment in the number of range sensors 134 contained in the end effector 130. As below, the same configurations as those of the first embodiment have the same signs and the detailed explanation will be omitted. The number of range sensors 134 contained in the end effector 130 may be five or more. Alternatively, the end effector 130 may contain three or more sets of two range sensors 134 arranged with the needle 132 in between. For example, in the embodiment, the robot 400 includes eight range sensors 134. In the embodiment, the eight range sensors 134 are four sets of range sensors 134. Each set of range sensors 134 of the four sets of range sensors 134 are formed by two range sensors 134 arranged with the needle 132 in between. The eight range sensors 134 are arranged on a circumference around the needle 132. Further, the range sensors 134 are arranged at equal angular intervals. Accordingly, the range sensors 134 are arranged so that, when the two range sensors 134 forming the respective sets are connected, the connecting directions may be different by 45 degrees.

As below, details of control executed by the control unit 210 when the moving direction of the needle 132 is changed from the first moving direction to the second moving direction will be explained. When the moving direction is changed from the first moving direction to the second moving direction, the control unit 210 acquires an amount of ejection in the first moving direction and an amount of ejection in the second moving direction using the two sets of range sensors 134 of the four sets.

Specifically, when the needle 132 is moved in the first moving direction, the amount of ejection is acquired using the first range sensor 134 and the second range sensor 134 as one set of range sensors selected from the four sets. The direction of the acquisition of the amount of ejection is the same as that of the first embodiment and the detailed explanation is omitted.

When the needle 132 is moved in the second moving direction, the amount of ejection is acquired using the third range sensor 134 and the fourth range sensor 134 as another one set of range sensors different from the set formed by the first range sensor 134 and the second range sensor 134. In this case, the third range sensor 134 and the fourth range sensor 134 are determined according to the amount of entanglement of the wire 140 in the robot 100 with the posture change of the arm 120 as is the case of the first embodiment.

Also, in the embodiment, the control unit 210 executes height correction processing and angle correction processing. For the height correction processing, the control unit 210 uses the range sensor 134 located anterior in the moving direction of the needle 132. In this case, the range sensor 134 overlapping in the moving direction of the needle 132 may be used or the range sensor 134 adjacent to the range sensor 134 overlapping in the moving direction may be used. In the angle correction processing, the control unit 210 uses three or more range sensors 134 that can measure the distances from an area without application of the ejected material.

According to the above described second embodiment, the same effects as those of the first embodiment may be exerted in the same configurations as those of the first embodiment. Further, according to the second embodiment, the control unit 210 can differently use the two or more sets of range sensors 134, specifically, the four sets of range sensors 134. Accordingly, compared to the case of using only one set of range sensors 134, when the moving direction of the needle 132 is changed, the degree of the posture change of the arm 120 around the needle 132 may be further reduced.

Figure 11:
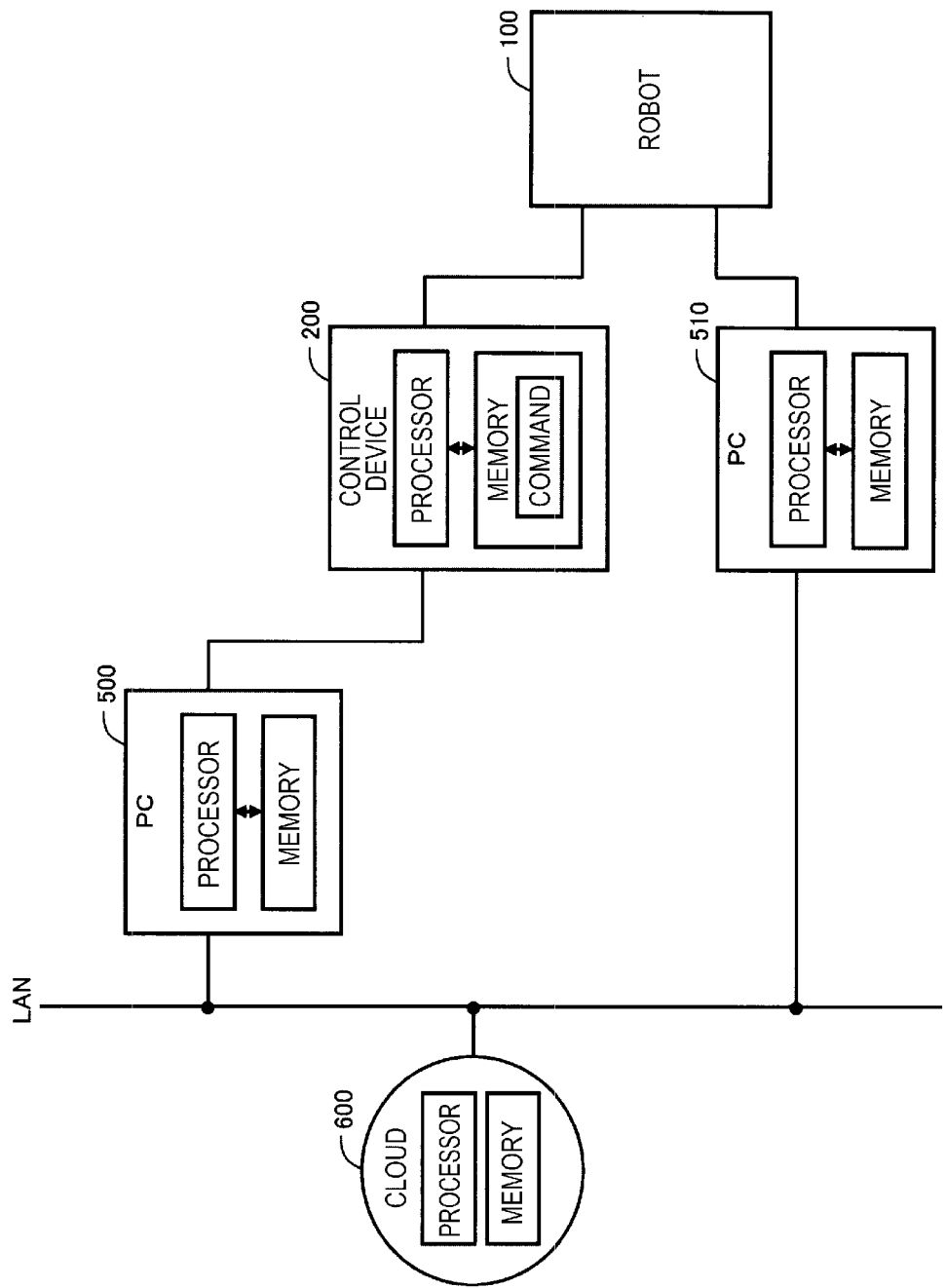
FIG. 11 is a conceptual diagram showing an example of a configuration of the control apparatus of the robot including a plurality of processors.

C. Third Embodiment (1) FIG. 11 is the conceptual diagram showing the example of the configuration of the control apparatus of the robot including a plurality of processors. In this example, in addition to the robot 100 and the control apparatus 200 thereof, personal computers 500, 510 and a cloud service 600 provided via a network environment such as LAN are drawn. Each of the personal computers 500, 510 includes a processor and a memory. In the cloud service 600, a processor and a memory are also available. The processor executes a computer-executable command. A robot control apparatus containing the control apparatus 200 and the teaching apparatus 300 can be realized using part or all of the plurality of processors. Further, a memory unit that stores various kinds of information can be realized using part or all of the plurality of processors.

Figure 12:
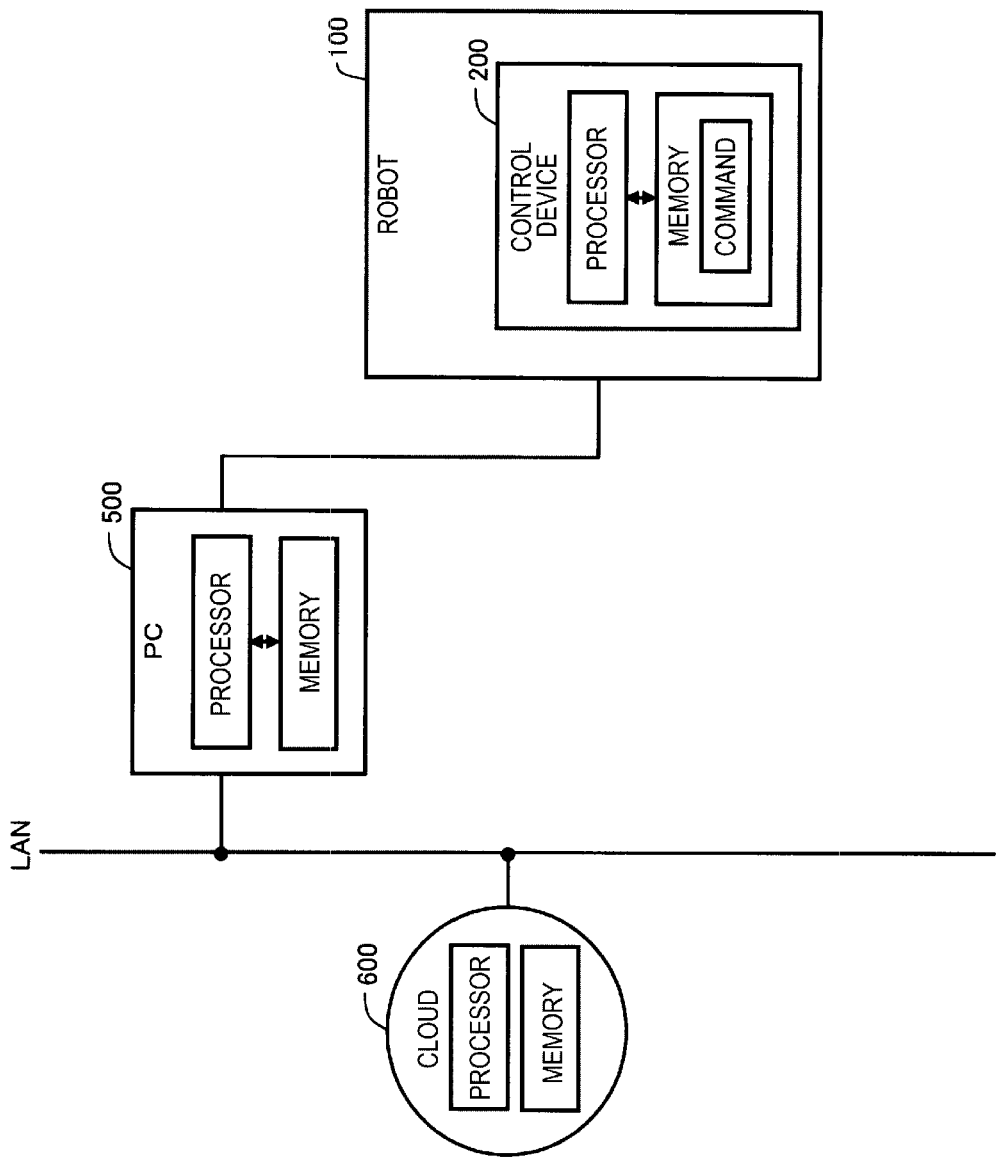
FIG. 12 is a conceptual diagram showing another example of the configuration of the control apparatus of the robot including a plurality of processors.

(2) FIG. 12 is the conceptual diagram showing the other example of the configuration of the control apparatus of the robot including a plurality of processors. This example is different from that in FIG. 12 in that the control apparatus 200 of the robot 100 is housed in the robot 100. Also, in this example, a robot control apparatus containing the control apparatus 200 and the teaching apparatus 300 can be realized using part or all of the plurality of processors. Further, a memory unit that stores various kinds of information can be realized using part or all of the plurality of processors.

D. Other Embodiments

D1. First Other Embodiment

The arrangement of the range sensors 134 is not limited to the arrangement explained in the above described embodiments. The arrangement of the range sensors 134 can be changed as appropriate around the needle 132. For example, the robot 100 may include two or more sets of range sensors 134 each formed by two range sensors 134 arranged with the needle 132 in between and directions connecting the range sensors forming at least two sets of range sensors of the two or more sets of range sensors 134 may cross each other. Further, the distances between the respective range sensors 134 and the needle 132 provided in the robot 100 are not necessarily the same.

D2. Second Other Embodiment

In the above described embodiments, the range sensor 134 is the ultrasonic sensor, but not limited to that. For example, the range sensor 134 may be a laser sensor including a laser source and an optical sensor. In this case, the laser sensor may be used for acquisition of the time of flight taken for returning of a pulsed laser beam after reflection by an object. In this case, the control unit 210 may acquire the distance by time-of-flight analysis of calculating the distance to the object based on the time of flight.

D3. Third Other Embodiment

In the above described embodiments, the force sensor 190 is not necessarily provided. When the force sensor 190 is not provided, the control apparatus 200 may complement the function of the force sensor 190 by calculating an amount of drive of the actuator provided in the robot 100 based on the details of the instruction given to the robot 100. When the robot system further includes an image acquisition apparatus such as a camera, the control apparatus 200 may acquire the posture of the robot 100 or the like based on image data acquired from the image acquisition apparatus.

D4. Fourth Other Embodiment

In the above described embodiments, the control unit 210 controls so that the needle 132 and the ejection surface S may be orthogonal in the angle correction processing, however, the control is not limited to that. For example, the control unit 210 may control so that the angle formed by the needle 132 and the ejection surface S may be a predetermined angle. More specifically, for example, the control unit 210 may control the posture of the arm 120 to incline the needle 132 so that the proximal end portion of the needle 132 may be anterior to the distal end portion in the moving direction of the needle 132. In this case, the ejected material 30 is ejected to the posterior side in the moving direction of the needle 132, and thereby, contact between the distal end of the needle 132 and the ejected material 30 ejected to the ejection surface S may be suppressed. Further, in this case, the control unit 210 may control the inclination of the needle 132 using only the two range sensors 134. For example, the control unit 210 may control so that detection values of two range sensors 134 of the range sensor 134 located anterior in the moving direction of the needle 132 and one range sensor 134 not forming a set with that range sensor 134 may be different values from each other. Even in this case, the control unit 210 may control so that the needle 132 and the ejection surface S may not be perpendicular. Alternatively, in the case of control so that the detection value of the range sensor 134 located anterior in the moving direction of the needle 132 may be smaller than the detection value of the other range sensor 134, the control unit 210 may control the posture of the arm 120 to incline the needle 132 so that the proximal end portion of the needle 132 may be anterior to the distal end portion.

D5. Fifth Other Embodiment

In the above described embodiments, the control unit 210 executes the height correction processing and the angle correction processing, however, the execution is not limited to that. For example, the control unit 210 does not necessarily execute at least one of the height correction processing and the angle correction processing.

D6. Sixth Other Embodiment

In the above described embodiments, the control unit 210 selects the range sensors 134 used for the respective processing according to the teaching data, however, means for selecting the range sensors 134 is not limited to that. For example, when the end effector 130 has a mechanism that can acquire the moving direction in real time, e.g., an acceleration sensor that can acquire an acceleration according to each moving direction, the control unit 210 may select the range sensor 134 for use according to the acquired moving direction.

D7. Seventh Other Embodiment

In the above described embodiments, the control apparatus 200 may further use the detection value acquired from the range sensor 134 for other processing. For example, the control apparatus 200 may control so that ejection of the ejected material 30 toward outside of the ejection surface S may be prevented using the value output from the range sensor 134. In this case, for example, the control apparatus 200 may instruct stoppage of the needle 132 when the detection value from the range sensor 134 in the moving direction of the arm 120 exceeds a reference value.

D8. Eighth Other Embodiment

In the above described embodiments, the robot 100 is the six-axis robot, however, not limited to that. The number of axes of the robot 100 may be seven or more, or five or less. Specifically, for example, the robot 100 may be a scalar robot as a single-axis robot. Even when the robot 100 is a scalar robot, the control apparatus 200 may execute the acquisition processing of the amount of ejection and the height correction processing like the above described embodiments.

D9. Ninth Other Embodiment

In the above described embodiments, the end effector 130 provided in the robot 100 includes the needle 132 as a dispenser that ejects the ejected material. However, the dispenser is not limited to the needle 132. For example, the robot 100 may include a jet dispenser as the dispenser.

In the above described first to ninth other embodiments, the same effects may be exerted in the same configurations as those of the above described embodiments.

The present disclosure is not limited to the above described embodiments, but may be realized in various configurations without departing from the scope thereof. For example, the technical features in the above described embodiments corresponding to the technical features in the respective aspects described in SUMMARY can be replaced or combined as appropriate for solving part or all of the above described problems or achieving part or all of the above described effects. Further, the technical features can be deleted as appropriate unless the technical features are explained as essential features in this specification.

(1) According to one aspect of the present disclosure, a control apparatus that controls a robot including a robot arm, a dispenser provided at a distal end of the robot arm and ejecting an ejected material, and range sensors arranged around the dispenser and detecting distances to an object in a direction in which the ejected material is ejected is provided. The control apparatus includes a control unit that controls an operation of the robot arm and calculates an amount of ejection of the ejected material ejected from the dispenser using values detected by the range sensors, and the control unit controls the robot arm, when the dispenser is moved in a first moving direction, to place the first range sensor anterior in the first moving direction relative to the dispenser and calculates the amount of ejection using a difference between a value detected by the first range sensor and a value detected by the second range sensor placed posterior in the first moving direction relative to the dispenser and controls the robot arm, when the dispenser is moved in a second moving direction, to place the third range sensor anterior in the second moving direction relative to the dispenser and calculates the amount of ejection using a difference between a value detected by the third range sensor and a value detected by the fourth range sensor placed posterior in the second moving direction relative to the dispenser.

According to the control apparatus of the aspect, two sets of range sensors provided in the robot can be differently used depending on the direction in which the dispenser moves. Accordingly, compared to the case where two sets of range sensors provided in the robot are not differently used, when the moving direction of the dispenser is changed, control to reduce the degree of the posture change around the dispenser in the robot may be performed. Thereby, damage on a wire due to pulling of the wire attached to the robot with the posture change around the dispenser may be suppressed.

(2) In the aspect, the control unit may change a distance between the dispenser and an ejection surface of the object by changing a posture of the robot arm according to a value detected by the first range sensor when the dispenser is moved in the first moving direction. When the dispenser is moved in the first moving direction, a detection position of the first range sensor is anterior to the dispenser. Therefore, according to the control apparatus of the aspect, the height of the dispenser may be changed before the dispenser reaches a location where the distance from the ejection surface changes.

(3) In the aspect, the control unit may keep the distance between the dispenser and the ejection surface to a predetermined distance by changing the posture of the robot arm according to the value detected by the third range sensor when the dispenser is moved in the second moving direction. According to the control apparatus of the aspect, the height of the dispenser may be corrected before the dispenser reaches the location where the distance from the ejection surface changes.

(4) In the aspect, the control unit may control the robot arm to incline the dispenser relative to the ejection surface according to the value detected by at least one of the third range sensor and the fourth range sensor and the value detected by the first range sensor. According to the control apparatus of the aspect, for example, the proximal end of the dispenser is controlled to be located anterior to the distal end, and thereby, control may be performed so that the ejected material may be ejected to the posterior side in the moving direction of the dispenser.

(5) In the aspect, the control apparatus may control the robot including ultrasonic sensors as the range sensors. According to the aspect, the control apparatus may execute control of the robot using the values measured by the ultrasonic sensors.

(6) In the aspect, the control apparatus may control the robot including laser sensors as the range sensors. According to the aspect, the control apparatus may execute control of the robot using the values measured by the laser sensors.

The present disclosure can be realized in other various aspects than the control apparatus. For example, the present disclosure may be realized in aspects including a robot controlled by a control apparatus, a robot system including a control apparatus and a robot, a control method for a robot, and a control program for controlling a robot.

What is claimed is:

1. A control apparatus that controls a robot including a robot arm, a dispenser provided at a distal end of the robot arm and ejecting an ejected material, and range sensors arranged around the dispenser and detecting distances to an object in a direction in which the ejected material is ejected, comprising a control unit that controls an operation of the robot arm and calculates an amount of ejection of the ejected material ejected from the dispenser using values detected by the range sensors, wherein the control unit controls the robot arm, when the dispenser is moved in a first moving direction, to place the first range sensor anterior in the first moving direction relative to the dispenser and calculates the amount of ejection using a difference between a value detected by the first range sensor and a value detected by the second range sensor placed posterior in the first moving direction relative to the dispenser and controls the robot arm, when the dispenser is moved in a second moving direction, to place the third range sensor anterior in the second moving direction relative to the dispenser and calculates the amount of ejection using a difference between a value detected by the third range sensor and a value detected by the fourth range sensor placed posterior in the second moving direction relative to the dispenser.

2. The control apparatus according to claim 1, wherein the control unit keeps a distance between the dispenser and an ejection surface of the object to a predetermined distance by changing a posture of the robot arm according to the value detected by the first range sensor when the dispenser is moved in the first moving direction.

3. The control apparatus according to claim 2, wherein the control unit keeps the distance between the dispenser and the ejection surface to a predetermined distance by changing the posture of the robot arm according to the value detected by the third range sensor when the dispenser is moved in the second moving direction.

4. The control apparatus according to claim 1, wherein the control unit keeps the direction in which the ejected material is ejected from the dispenser perpendicular to the ejection surface by changing the posture of the robot arm according to the value detected by at least one of the third range sensor and the fourth range sensor and the value detected by the first range sensor.

5. The control apparatus according to claim 1, controlling the robot including ultrasonic sensors as the range sensors.

6. The control apparatus according to claim 1, controlling the robot including laser sensors as the range sensors.

7. A robot system comprising:

a robot including a robot arm, a dispenser provided at a distal end of the robot arm and ejecting an ejected material, and range sensors arranged around the dispenser and detecting distances to an object in a direction in which the ejected material is ejected; and the control apparatus according to claim 1 controlling the robot.

8. A robot controlled by a control apparatus, comprising:

a dispenser ejecting an ejected material to an ejection surface;

range sensors detecting distances to an object in a direction in which the ejected material is ejected; and a robot arm driven according to control by the control apparatus with the dispenser placed at a distal end and the range sensors arranged around the dispenser, wherein when the dispenser is moved in a first moving direction, the robot arm changes a posture to place the first range sensor anterior in the first moving direction relative to the dispenser according to control from the control apparatus, and an amount of ejection of the ejected material is calculated according to a difference between a value detected by the first range sensor and a value detected by the second range sensor placed posterior in the first moving direction relative to the dispenser, and when the dispenser is moved in a second moving direction, the robot arm changes the posture to place the third range sensor anterior in the second moving direction relative to the dispenser according to control from the control apparatus, and the amount of ejection of the ejected material is calculated according to a difference between a value detected by the third range sensor and a value detected by the fourth range sensor placed posterior in the second moving direction relative to the dispenser.

9. The robot according to claim 8, wherein the range sensors are ultrasonic sensors.

10. The robot according to claim 8, wherein the range sensors are laser sensors.

* * * * *